United States Patent [19]

Dyer

[11] Patent Number: 5,148,576
[45] Date of Patent: Sep. 22, 1992

[54] CONDUIT CLAMP

[75] Inventor: Edward P. Dyer, Germantown, Wis.

[73] Assignee: Tyton Corporation, Milwaukee, Wis.

[21] Appl. No.: 772,704

[22] Filed: Oct. 7, 1991

[51] Int. Cl.$^5$ .............................................. B65D 63/02
[52] U.S. Cl. .................................. 24/20 R; 24/16 R; 24/20 EE; 24/20 TT
[58] Field of Search ............ 24/20 R, 20 TT, 20 EE, 24/23 EE, 20 CW, 16 R, 270, 273, 543; 285/921

[56] References Cited

U.S. PATENT DOCUMENTS

| | | | |
|---|---|---|---|
| 3,605,200 | 9/1971 | Vallinotto et al. | 24/20 TT |
| 3,925,851 | 12/1975 | Bevans | 24/20 TT |
| 4,128,918 | 12/1978 | Wenk | 24/16 R |
| 4,306,740 | 12/1981 | Kleykamp et al. | 24/20 TT |
| 4,312,525 | 1/1982 | Kleukamp | 24/20 TT |
| 4,372,011 | 2/1983 | Aranyos | 24/20 TT |
| 4,557,024 | 12/1985 | Roberts et al. | 24/16 R |
| 4,663,807 | 5/1987 | Bozzo | 24/20 TT |
| 4,713,863 | 12/1987 | Jennings | 24/20 EE |
| 4,935,992 | 6/1990 | Due | 24/16 R |

Primary Examiner—Victor N. Sakran
Attorney, Agent, or Firm—Michael, Best & Friedrich

[57] ABSTRACT

A snap-on clamp for securing a conduit includes an open-ended loop having complementary, interlocking clamps at each end. The clamps each include a jaw portion having teeth opposed to and engageable with the teeth on the other jaw portion and manually engageable pressure pads on each clamp for forcing the clamps toward each other. The teeth are angled to permit sliding movement toward a closed position as the manually engageable portions are forced toward each other and which are lockable against movement toward an open position. One clamp also includes an opposed tongue portion spaced from the jaw portion for engaging the opposite surface of the jaw portion on the other clamp for resiliently resisting separation of the teeth. A pressure responsive indicator is movable from a first position to a second position when the resisting force on the loop exceeds a predetermined value to provide an indication that the application of additional force to the manually engageable means will overstress the conduit.

4 Claims, 1 Drawing Sheet

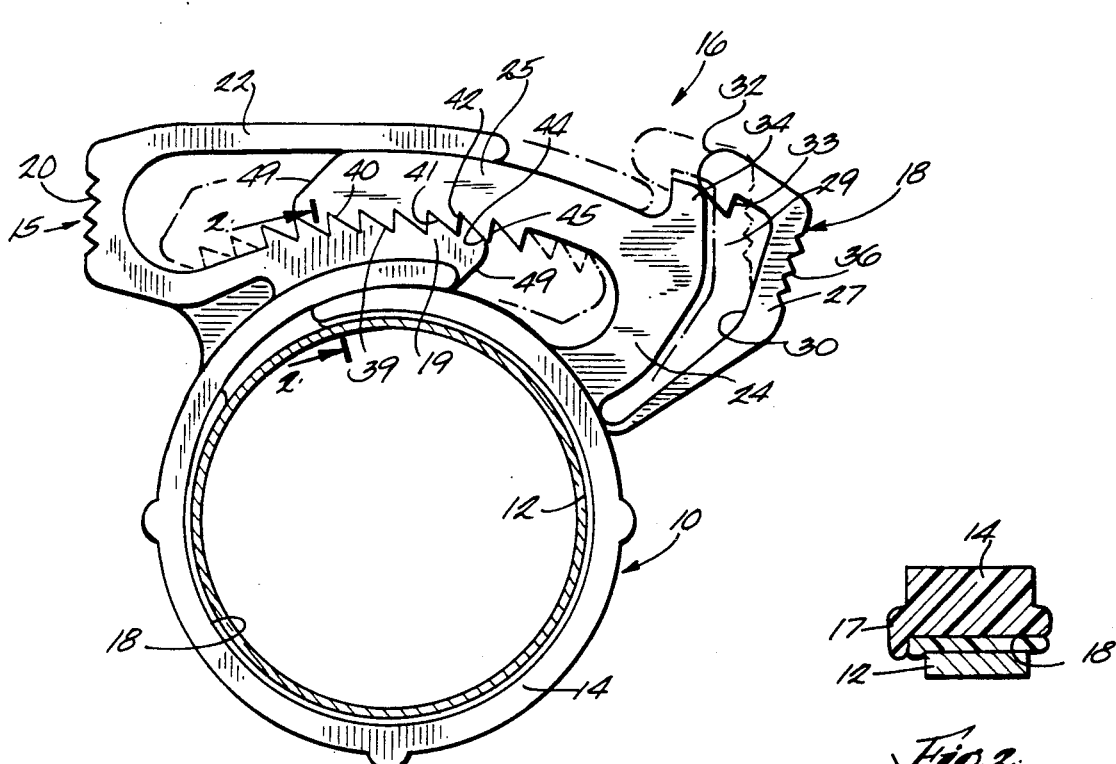

5,148,576

CONDUIT CLAMP

BACKGROUND OF THE INVENTION

This invention relates to clamps for securing conduits and the like.

One type of conduit clamp comprises an open loop or band of a polymeric material having complementary, interlocking clamps at each end. The clamps include jaw portions having opposed, engageable teeth angled to permit sliding movement toward a closed position but which interlock to oppose movement toward an open position. Such clamps also commonly include at least one tongue portion resiliently engageable with the opposite side of the jaw portion on the other clamp for biasing the teeth against separation. The end clamps also commonly include manually engagement pressure pads for forcing the clamps into a closed position. Conduit clamps of this type are disclosed, for example, in U.S. Pat. Nos. 4,128,918, 4,306,740, and 4,312,525.

Such prior art conduit clamps are not wholly satisfactory because the application of excess clamping pressure can overstress the conduit being secured.

SUMMARY OF THE INVENTION

It is an object of the invention to provide a new and improved conduit clamp.

Another object of the invention is to provide a conduit clamp which provides an indication when the clamping force exceeds a predetermined value.

A further object of the invention is to provide a conduit clamp which minimizes the possibility of damage to the conduit being clamped.

These and other objects and advantages of the invention will become more apparent when taken together with the drawings and the detailed description thereof.

According to one aspect, the invention comprises a clamp including band means formed into a loop, first and second clamp means disposed respectively on the opposite ends of the band means, each of the clamp means including engageable teeth means which cooperate to permit movement of the clamp means toward each other for increasing the force of the band means on the conduit disposed therein and which resist movement of the clamp means in an opposite direction, and force indicator means mounted on the band means and responsive to the circumferential forces in the band means and movable from a first position to a second position when the force applied on the clamp means equals a predetermined value.

BRIEF DESCRIPTION OF THE DRAWINGS

FIG. 1 is a side view showing a conduit clamp according to the preferred embodiment of the invention; and FIG. 2 is a view taken along lines 2—2 of FIG. 1;

DETAILED DESCRIPTION OF THE PREFERRED EMBODIMENT

FIGS. 1 and 2 show a clamp 10 according to the preferred embodiment of the invention for securing a conduit such as 12. The clamp 10 includes a band 14 formed in an open-ended loop and having complementary, interlocking clamps 15 and 16 integrally formed on each end. While the band 14 is shown in FIG. 1 to be generally annular, those skilled in the art will appreciate that the shape of the band 14 can have any shape as required to clamp the conduit 12 being secured. In addition, the cross sectional configuration of the band 14 may have any convenient shape commensurate with the required strength, the composition of the material being employed and the method of manufacture.

The ends of the band 14 overlap when the clamps 15 and 16 are in a clamped position and there is a circumferential lip 17 formed on the band to act as a guide as shown in FIG. 3. In the illustrated embodiment, the band 14 is otherwise generally rectangular in transverse cross section and the inner surface 18 of the band is preferably free of irregularities and engagement with the outer surface of conduit 12 is provided along substantially the entire length of the band 14.

The clamps 15 and 16 are complementary and each includes an opposed interlocking jaw portion. In particular, the clamp 15 includes a first jaw 19 integrally formed on one end of band 14 and extending in the circumferential direction and toward the second clamp 16. In addition, a pressure pad 20 is integrally formed at the rear of clamp 15 and a tongue 22 extends from its upper end in a spaced apart, generally parallel relation to jaw 19. Pressure pad 20 preferably has serrations formed thereon to facilitate gripping.

Clamp 16 includes a body portion 24 integrally formed adjacent the other end of band 14, but spaced inwardly therefrom. An upper jaw 25 extends from body portion 24 and in an opposite direction relative to jaw 19. There is also a pressure indicator arm 27 molded on band 14 and extending generally outwardly from the base of body portion 24 and in general parallelism with and spaced from the rear surface 29 of body portion 24. In addition, the inner surface 30 of arm 27 is configured substantially complementary to the surface 29. The upper end of arm 27 has an arcuate surface 32 which curves downwardly to form a hook 33 at its underside. Surface 32 engages a catch 34 extending integrally upwardly from body portion 24. Serrations 36 may be formed on the rear surface of the arm 27 to facilitate gripping.

A first row of teeth 39 is formed on the upper surface of jaw 19 and a second row of teeth 40 are formed on the underside of jaw 25. When the clamps 15 and 16 are in their clamped position as shown in FIG. 2, the teeth 39 are in engagement with the teeth 40 and the tongue 22 engages the upper surface of jaw 25. In addition, the opposite end of the band 14 is tapered slightly for engaging the underside of the jaw 19. The teeth 39 and 40 are complementary and are formed so that the jaws 19 and 25 can slide toward a locking position but which are locked against movement in the opposite direction. In particular, teeth 39 are formed of intersecting surfaces 41 and 42, both of which define an acute angle relative to the direction of locking movement and are inclined rearwardly relative to jaw 19. Similarly, the teeth 30 are formed of intersecting surfaces 44 and 45 which are inclined rearwardly relative to jaw 25 and at the same angles as surfaces 41 and 42. Thus, both the teeth 39 and 40 are inclined away from the direction of locking movement and toward the locked position with the surfaces 41 and 44 inclined to permit movement in the forward direction and the surfaces 42 and 45 are inclined to prevent movement in the opposite direction.

The clamps are secured by forcing pressure pads 20 and 36 toward each other, which forces the jaw 25 between the jaw 19 and the lip 22 while the jaw 19 moves between the jaw 25 and the extension of the band 14. The front surfaces 48 and 49 of jaws 19 and 25 are tapered to facilitate the insertion. Initially, the rigidity of the arm 24 will be sufficient to maintain the closing pressure on the body 24 as the curved surface 32 on the upper end of arm 27 engages the corner of the catch 33 and the jaw 25 is forced between the jaw 19 and the lip 22. As the clamps move further toward the closed position, the resisting force exerted by the conduit 12 on the band 14 will increase. When the pressure on the conduit 12 reaches a predetermined value, the force exerted on the pressure pad 36 will overcome the resistance exerted by the arm 27 so that the arm will bow outwardly, thereby permitting the hook 33 to pass over the latch 32 and move from its position shown by full lines in FIG. 1 to its position shown by broken lines. This provides both a physical and visual indication that the maximum desired force on the conduit 12 has been reached and insures that the conduit 12 is not overstressed.

While only a few embodiments of the invention have been illustrated and described, it is not intended to be limited thereby, but only the by scope of the appended claims.

I claim:

1. A clamp including band means formed into a loop, first and second clamp means disposed respectively on the opposite ends of said band mans, each of said clamp means including engageable teeth means which cooperate to permit movement of said clamp means toward each other for increasing the force of said band means on the conduit disposed therein and which resist movement of said clamp means in an opposite direction, force indicator means mounted on said band means and responsive to the circumferential forces in said band means and movable from a first position to a second position when the force applied on said clamp means equals a predetermined value so that movement of said force indicator means from said first position to said second position indicates that said predetermined value of said force has been applied.

2. The clamp set forth in claim 1 wherein said indicator means comprises arm means mounted on said band means and movable from a first position to a second position when the force applied on said clamps means exceeds a predetermined value.

3. A clamp including band means formed into a loop, first and second clamp means disposed respectively on the opposite ends of said band means, each of said clamp means including engageable teeth means which cooperate to permit movement of said clamp means toward each other for increasing the force of said band means on the conduit disposed therein and which resist movement of said clamp means in an opposite direction, force indicator means mounted on said band means and responsive to the circumferential forces in said band means and movable from a first position to a second position when the force applied on said clamp means equals a predetermined value, said indicator means comprising arm means mounted on said band means and movable from said first position to said second position when the force applied on said clamp means exceeds said predetermined value, and said arm means being mounted at one end on said band and adjacent one of said clamp means, said arm means being normally spaced from said clamp means and engaging said clamp means at its other end so that application of force to the arm means will move the one clamp means toward the other, the engagement of the other end of the arm means with the clamp means acting to hold the arm means in a spaced relation relative to the clamp means, and said arm means being movable from said first position to said second position when the force thereon exceeds said predetermined value.

4. The clamp set forth in claim 3 wherein said arm means is resilient and has a contact surface formed adjacent its other end for engaging the clamp means and a hook means adjacent said contact surface, said clamp means including a latch portion engageable by the surface of the arm means, the surface and hook means of the arm means moving resiliently over said catch when the applied force exceeds a predetermined value wherein said arm means will be retained in its second position.

* * * * *